United States Patent [19]

Miller

[11] Patent Number: 4,584,719
[45] Date of Patent: Apr. 22, 1986

[54] FIBER OPTIC WORKSTATION DATALINK INTERFACE

[75] Inventor: Bruce J. Miller, Malvern, Pa.

[73] Assignee: System Development Corp., Camarillo, Calif.

[21] Appl. No.: 644,066

[22] Filed: Aug. 24, 1984

[51] Int. Cl.[4] .......................... H04B 9/00; G06F 3/00
[52] U.S. Cl. ..................................... 455/608; 455/609; 364/200; 364/900; 340/825.64; 307/518
[58] Field of Search ............... 455/609, 608, 600, 601; 364/900, 200; 340/825.64; 307/517, 518, 522

[56] References Cited

U.S. PATENT DOCUMENTS

| | | | |
|---|---|---|---|
| 4,003,032 | 1/1977 | Austin et al. | 364/200 |
| 4,047,159 | 9/1977 | Boudry | 364/200 |
| 4,208,724 | 6/1980 | Rattlingourd | 364/900 |
| 4,282,604 | 8/1981 | Jefferson | 455/602 |
| 4,441,162 | 4/1984 | Lillie | 364/900 |
| 4,451,916 | 5/1984 | Casper et al. | 455/601 |

*Primary Examiner*—Robert L. Griffin
*Assistant Examiner*—Timothy K. Greer
*Attorney, Agent, or Firm*—Francis A. Varallo; Mervyn L. Young; Kevin R. Peterson

[57] ABSTRACT

Workstations may advantageously be interconnected in a cluster arrangement wherein multiple "slave" stations utilize the database which exists in a "master" unit. The cluster interface has been implemented as a wired system but the latter involves significant limitations as to distance between units, electrical noise restricting data transmission rates and the protection of sensitive data from compromise. The fiber optic interface module of the present invention eliminates the foregoing limitations by translating the electrical signals of the wired system into optical signals for transmission and restoring them to electrical signals at a receiving unit.

14 Claims, 3 Drawing Figures

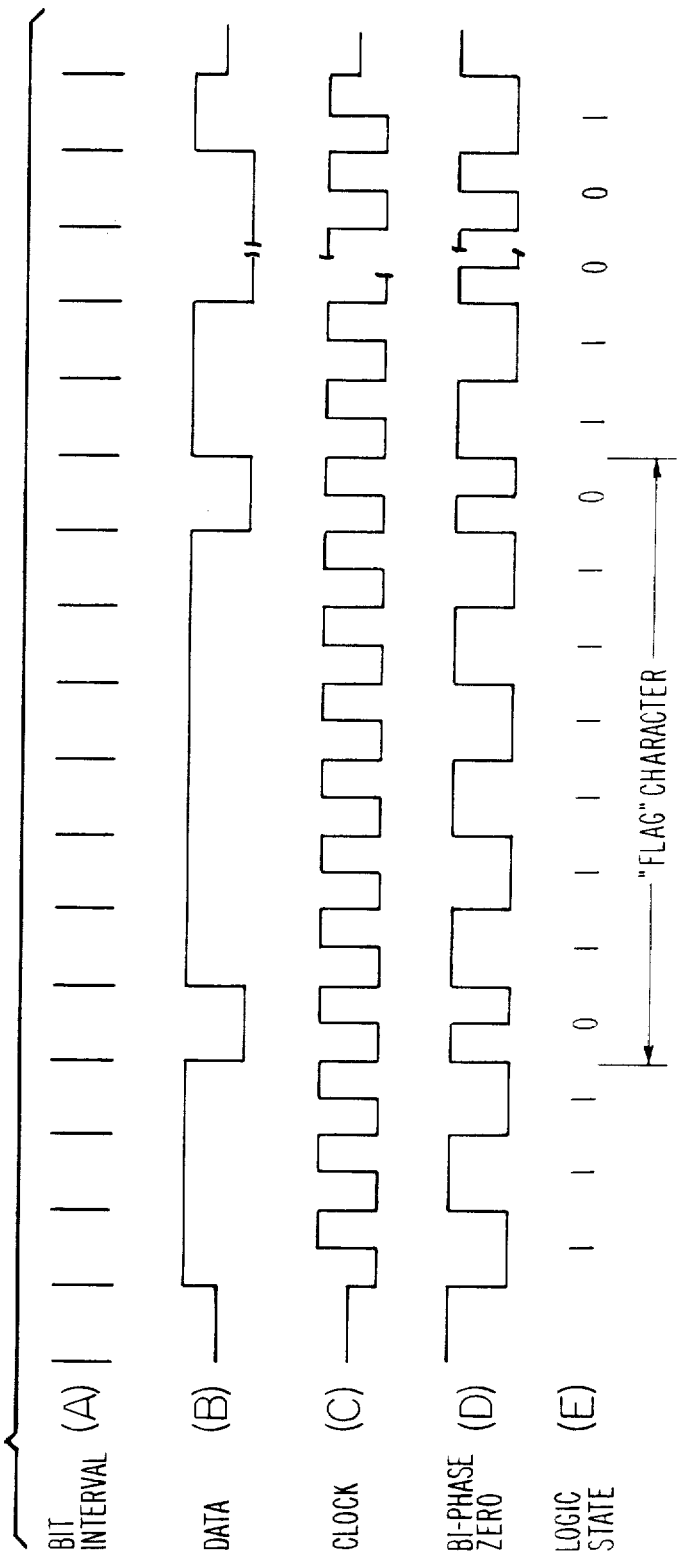

FIBER OPTIC WORKSTATION DATALINK INTERFACE

BACKGROUND OF THE INVENTION

A present day workstation configuration employs a cluster interconnection scheme in which multiple "slave" workstations utilize the database existing in a "master" unit. The cluster interface is implemented as a "daisy-chained" wired system, utilizing two digital signals, data and clock. A bidirectional electrical interface is used and a single jacketed cable containing two individually shielded twisted pairs is run from one workstation to the next, with the cables resistively terminated at the extreme ends of the line.

Communications along the line use a "poll and select" protocol, wherein the "master" periodically interrogates each "slave" to see if communication is desired. The "master" can direct data to a particular slave via its unit address. A bit-oriented protocol is used by all of the workstations. Transmissions are necessarily half-duplex along the clock and data busses. Transmission by any unit involves the enabling of its data and clock drivers and the generation of a predetermined signal pattern including a "flag" character. Receipt of the latter by the receiving stations is a prerequisite for the acceptance of transmittal information.

Each workstation in the cluster has an inherent communication bit rate. It is the function of the "master" to determine the maximum rate for the entire cluster, based upon the slowest "slave".

The wired cluster has several fundamental limitations. An overall cluster length limit, as well as a maximum distance between workstations must be imposed. This condition results from wire capacitance and the drive capability of the cluster interface circuits. Additionally, ground potential differences between units connected to different power sources introduce noise into the system which can, at times, cause so many data errors that cluster data cannot be transmitted at a high rate. Finally, wired cluster cables carrying sensitive data which pass through unprotected areas are subject to compromise.

What is required is an interface which is not subject to the foregoing limitations, performs all of the functions of the wired interface and is a direct replacement therefor. The fiber optic interface module of the present invention fills such a need.

SUMMARY OF THE INVENTION

In accordance with the present invention, a fiber optic interface module is provided which translates the electrical signals carried by the wired cluster interface into optical signals for transmission, and reconverts them to electrical signals at the receiving unit.

Because fiber optics can only efficiently support light transmission in one direction, a cable consisting of two individual fibers is run between workstations. One fiber is used for transmission in each direction, with data and clock signals combined into a complex signal for transmission, and separated into its component signals at the receiving end. The conversion from the bidirectional data bus used by the workstation to the simplex, that is, dual unidirectional, optical data transmission mode and return is also implemented in the interface module.

The present interface also passes, without alteration, transmissions from "upstream" stations to "downstream" stations, and vice versa. In this case, the combined optical data/clock signal is converted back to an electrical signal by the optical receiver. The latter signal is then applied to the optical unit driving the cable going to the next station. It is apparent that because of the signal buffering between stations, the restriction on the maximum length of the cluster is now equal to the maximum distance between stations multiplied by the maximum number of stations in the cluster.

It is a feature of the present optical interface that it is capable of determining the bit rate of the incoming data within a fraction of the bit period. Accordingly the appropriate data detector circuit paths are quickly established and any loss of data or delay in the data stream, prevented.

Other features and advantages of the optical interface of the present invention will become apparent in, the detailed description which follows.

BRIEF DESCRIPTION OF THE DRAWING

FIG. 2 is a waveform diagram accompanying the schematic of FIG. 1.

DESCRIPTION OF THE PREFERRED EMBODIMENT

Figure 1A:
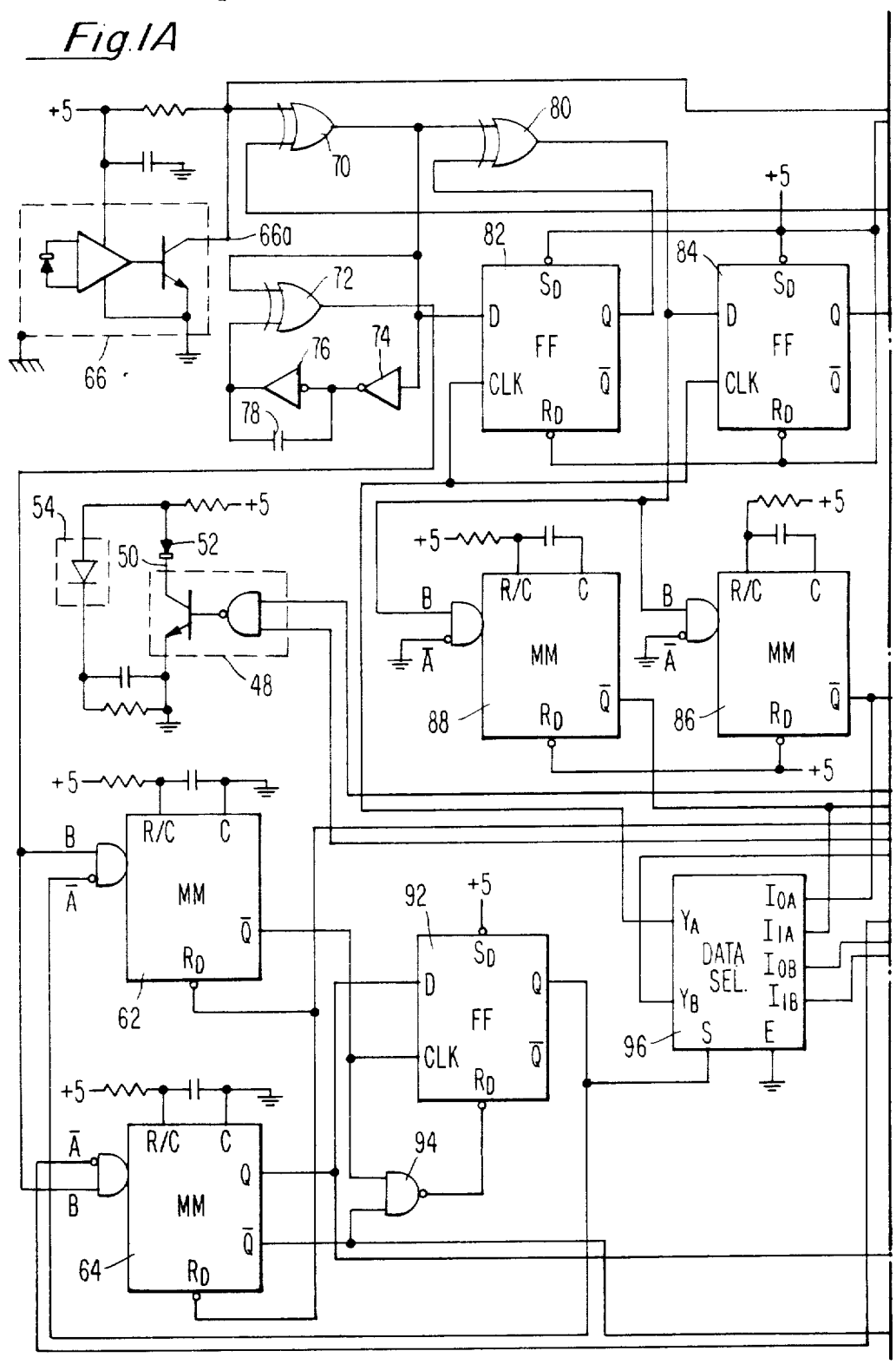
FIG. 1 comprises FIGS. 1A and 1B which together provide a schematic diagram of the optical interface of the present invention.
Figure 1B:
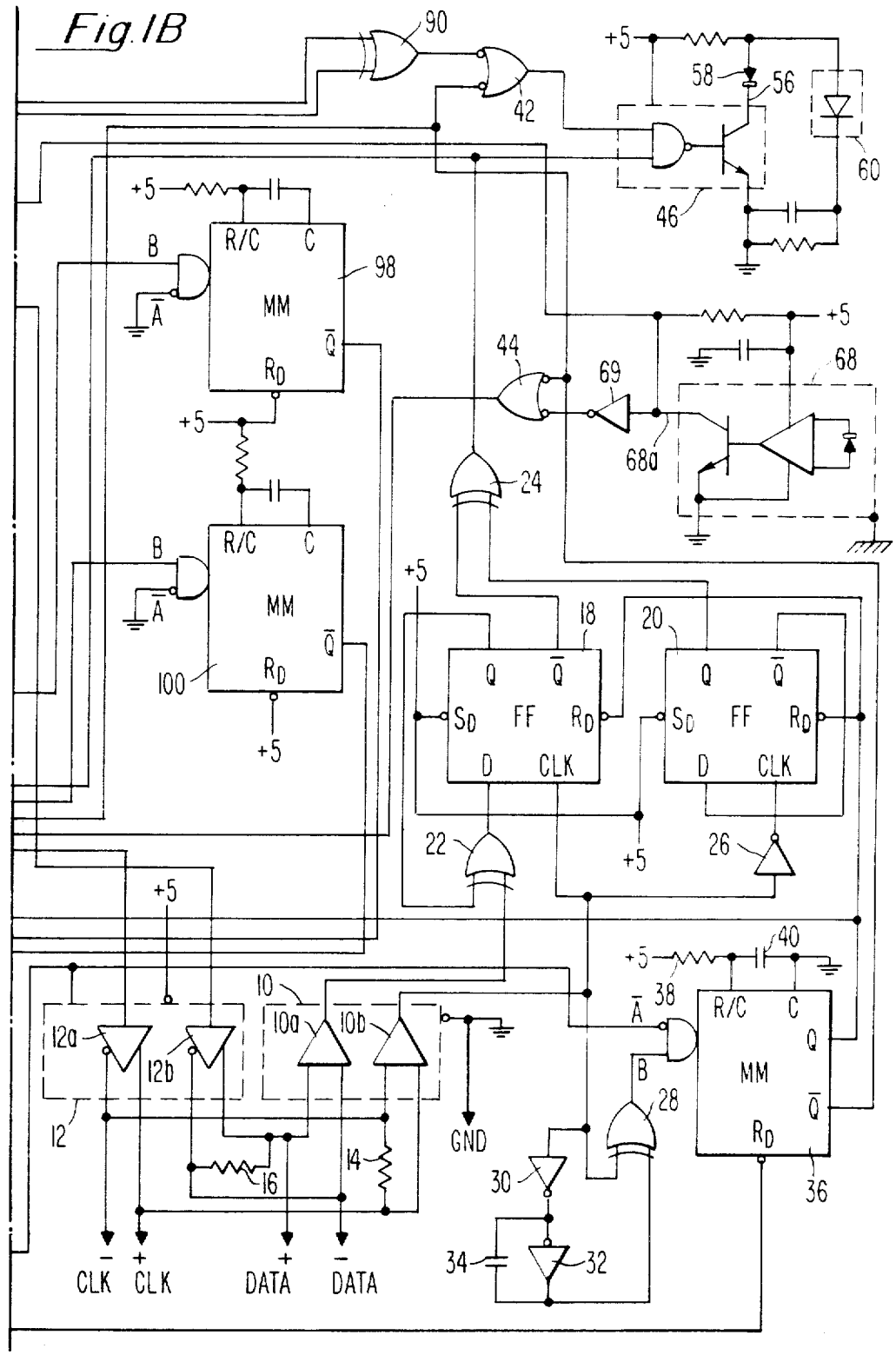

With reference to the schematic of FIG. 1, receiver unit 10 and driver unit 12 combine to form an RS422A compatible balanced interface to the workstation, and are physically attached to opposite extremities of a cable which terminates at the normal cluster outputs. Each of the clock and data pairs, that is, amplifiers 10a and 10b in unit 10 and 12a and 12b in unit 12 are terminated in twice their characteristic impedances by resistors 14 and 16 respectively, at each end of the cable.

With continued reference to FIG. 1 and additional reference to FIG. 2 where indicated, transmission from the workstation is accomplished in the following manner utilizing the optical interface of the present invention.

D-type flip-flops 18 and 20, together with two exclusive-OR gates 22 and 24, and inverter 26 operate as an encoder to combine the input clock and data signals supplied by receiver unit 10 to form a "bi-phase zero" combined waveform as seen in "D" of FIG. 2. "Bi-phase zero" is one of many so-called self-clocking serial data transmission codes in present day use. It is similar in many respects to the best known of these codes, Manchester, but possesses several unique advantages in the current application. Both codes have a combination of timing elements which are either a full or half data bit interval. As seen in FIG. 2, for the bit intervals indicated in "A" thereof, and the data and clock waveforms of "B" and "C", the bi-phase zero (sometimes referred to as "bi-phase space") waveform depicted at "D", shows a transition at the edge of every data bit period. In addition, as seen in the logic state indicator of "E", a period representing a logic "0" contains an additional transition at mid-bit time, as seen in waveform "D". It is apparent that the bi-phase zero code generates a wavetrain with substantially a perfect 50% duty cycle. Further, it is polarity insensitive, that is, inverting the wavetrain does not change "1"'s to "0"'s, or vice versa. This is not true of Manchester coding.

Returning to a consideration of the bi-phase zero encoder depicted in FIG. 2, the clock signal from amplifier 10b of unit 10 is applied to the "CLK" terminal of flip-flop 18 and after inversion in inverter 26 to the "CLK" terminal of flip-flop 20. Data on the other hand, supplied by amplifier 10a of unit 10 is applied to one of a pair of input terminals of exclusive-OR gate 22, the output of which is applied to the "D" input terminal of flip-flop 18. The other terminal of exclusive-OR gate 22 is coupled to the "Q" output terminal of flip-flop 18. The "D" input terminal of flip-flop 20 is connected to the latter's "$\overline{Q}$" output terminal.

The foregoing circuit arrangement results in the following operation. Flip-flop 20 always changes states at the rise of the clock signal applied thereto, and generates the reference edges of the coded output (waveform "D" of FIG. 2), which are at the beginning of each of the bit intervals indicated at "A" in the last mentioned figure. Flip-flop 18 is clocked at the falling edge of the incoming clock signal, and may or may not change state, depending on the logic level on its "D" input terminal. The output terminals "$\overline{Q}$" and "Q" of flip-flops 18 and 20 respectively are applied to an exclusive-OR gate 24, the output of which is the bi-phase zero waveform "D" of FIG. 2. The sequence of operation of the encoder provides that at the rise of the incoming clock, applied to flip-flop 20, the bit interval is begun by inverting the output of exclusive-OR gate 24. At the mid-bit interval, with the fall of the clock signal applied to flip-flop 18, the output of exclusive-OR gate 24 will remain the same for an incoming data logical "1" and be reinverted for a logical "0".

The input clock signal is also applied to an edge detector formed from exclusive-OR gate 28 and inverters 30 and 32. Thus, the clock signal is applied in common to one input terminal of exclusive-OR gate 28 and to the input of a pair of series connected inverters 30 and 32. The output of inverter 32 is connected to the other input of exclusive-OR gate 28. Inverters 30 and 32 provide a combined delay, augmented in inverter 32 by capacitor 34. When the inputs to exclusive-OR gate 28 are different, as occurs when there is a change from one logical level to another, gate 28 will produce an output pulse having a duration determined by the aforementioned inverter delays. Stated succinctly, exclusive-OR gate 28 generates an output pulse for every transition of the input clock signal.

The output pulse from exclusive-OR gate 28 in the edge detector is applied to the "B" input terminal of a retriggerable monostable multivibrator 36. The period of the latter as determined by resistor 38 and capacitor 40 coupled to the "R/C" and "C" terminals, is chosen to be slightly longer than ½ the slowest cluster clock rate bit period, for example 2.25 microseconds. Thus, output terminal "Q" of monostable multivibrator 36 will go high with the first clock transition, and remain so until shortly after the clock signal from the workstation terminates. The corresponding low signal on the "$\overline{Q}$" output terminal of monostable multibrator 36 is applied to the respective input terminals of NOR gates 42 and 44. The outputs of the latter gates 42 and 44 are applied respectively to one of a pair of input terminals of drivers 46 and 48. The other input terminals of the last mentioned units are coupled in common to the output terminal of exclusive-OR gate 24—the "bi-phase zero" signals appearing thereon. Driver 48, having an output at point 50, along with diode 52, actuates LED 54. The latter feeds the "upstream" fiber optic cable. Similarly, driver 46 with output at 56, together with diode 58, provide a drive circuit for LED 60, associated with the "downstream" cable. During the transmission of data from the workstation, the pair of monostable multivibrators 62 and 64, associated with the reception of data by the station, are held in an inactive state. This condition results from the application of the low level signal on the "$\overline{Q}$" terminal of monostable multivibrator 36 to the reset "$R_D$" terminals of the former. As will be considered hereinafter, multibrator 36 is likewise held in an inactive reset state during receipt of data by the workstation. This cross-lockout ensures that no data collisions can occur, as only data transmission or reception, or neither, is possible, but not both.

It should be noted that the protocol generated by the workstation operating systems assures that only one station will attempt to transmit at any given time and that all other units are waiting to receive data.

With continued reference to FIGS. 1 and 2, the reception of data by the workstation is accomplished as follows.

As noted hereinbefore, data may be received from the "upstream" or "downstream path". The former involves an integrated fiber optic receiving unit 66; the latter, unit 68. To properly duplicate the operation of the wired cluster, which the present optical interface replaces, the latter must pass any received data, unchanged, further along the cluster for reception by the other workstations. Also the interface must reconvert the received data back to its original form for use by its workstation.

It will be assumed for purpose of example, that an optical transmission is received by unit 66 from an "upstream" workstation. The output of receiving unit 66, and also that of the "downstream" unit 68 are applied to respective ones of the pair of input terminals of exclusive-OR gate 70. The output of the last mentioned gate is applied to an edge detector of the type described hereinbefore. The edge detector includes exclusive-OR gate 72, a pair of inverters 74 and 76, and capacitor 78. The output of exclusive-OR gate 70 is also applied to a bi-phase zero data detector. The latter includes an exclusive-OR gate 80, D-type flip-flops 82 and 84, and a pair of monostable multivibrators 86 and 88.

The data received by receiving unit 66 is also applied via exclusive-OR gate 90 (wired as an inverter) and NOR gate 42 to driver 46 for the transmitting LED 60. Since the bi-phase encoded data stream is not polarity dependent, the inversion occurring in this circuit path helps equalize pulse width distortion introduced by the optical conversion process. Similarly, encoded data received by unit 68 is gated through inverter 69 and NOR gate 44 to driver 48.

In order for the bi-phase zero data detector to operate properly, the data rate of the incoming data must be known. As noted previously, the cluster may operate with at least two rates, for example, a 307.2K or 1.8432 M bit rate, or a combination of these rates as used in actual operative workstations. Therefore, the present optical interface must determine this rate and connect the proper monostable multivibrator, either 86 or 88, into the data detector circuit without losing any data or delaying the data stream.

A determination of the incoming data rate is made in less than a bit period by a circuit comprised of retriggerable monostable multivibrators 62 and 64, together with D-type flip-flop 92 and NAND gate 94. The incoming data is "bi-phase zero", encoded as seen in waveform "D" of FIG. 2. It should be recalled that in this coding scheme, a polarity transition occurs at the edge of every bit period, as indicated by the bit interval markers at "A" in FIG. 2. Data "1"'s are a full bit time wide, while "0"'s have a transition (whose direction is opposite to that of the previous edge transition) in the middle of a bit period. The bit period of 1.8432 M bit data is 543 nanoseconds, while for 307.2K bit data, the bit period is 3.25 microseconds.

When no data is received by the workstation, monostable multivibrators 62 and 64 are untriggered and flip-flop 92 is directly reset through the output of NAND gate 94 applied to its "$R_D$" terminal. When data is received by either receiving unit 66 or 68, the signal on the output of exclusive-OR gate 72 in the edge detector is applied in common to the "B" input terminals of both monostable multivibrators 62 and 64. If 1.8432 M bit data is being received, both of the last mentioned multivibrators will be retriggered at least every 543 nanoseconds. The resistive and capacitive timing components connected to the "R/C" and "C" terminals of monostable multivibrator 62 provide a pulse upon triggering which has a 900 nanosecond duration; the timing components for monostable multivibrator 64, a 5 microseconds pulse width. It is apparent that with 1.8432 M bit data, neither monostable multivibrator 62 nor 64 will time-out before the data stream ends, and the reset state of flip-flop 92 will remain unchanged. However, if 307.2K bit data is received, monostable multivibrator 62 will time-out after 900 nanoseconds, setting flip-flop 92 by virtue of the signal level on the "$\overline{Q}$" terminal of the former. Thus, flip-flop 92 serves to store the data rate of the incoming data. The output level on the "$\overline{Q}$" terminal of monostable multivibrator 64 during the receipt of information by the workstation is applied to the reset terminal "$R_D$" of monostable multivibrator 36 to keep the latter in an inactive state. A slow rate is determined in less than one third of a bit time. Since, as indicated by "E" of FIG. 2, there are at least three non-significant data bits before the "flag" character, this has minimal effect on the data stream.

Flip-flop 92 controls the operation of the two input data selector/multiplexer 96 by virtue of the connection of the "Q" output terminal of the former to the "S" select input terminal of the latter. A function of data selector 96 is to steer the output of the proper monostable multivibrator 86 or 88 in common to the D-type flip-flops 82 and 84. This is accomplished by connecting the respective "$\overline{Q}$" output terminals of the monostable multivibrators 86 and 88 to input terminals "$I_{0A}$" and "$I_{1A}$" of data selector 96, and connecting the "$Y_A$" output terminal of the latter to both "CLK" terminals of flip-flops 82 and 84, disposed in the bi-phase data detector or demodulator.

Incoming data received by either receiving unit 66 or 68, the outputs of which appear at points 66a and 68a, are applied respectively to the input terminals of exclusive-OR gate 70. The output signal of the latter gate is the bi-phase zero data stream to be detected. The data is applied to one of the pair of input terminals of exclusive-OR gate 80 and to the "D" input of flip-flop 82. The output of exclusive-OR gate 80 is applied in common to the "B" inputs of two monostable multivibrators 86 and 88. The former generates a 2.4 microsecond pulse; the latter, a 350 nanosecond pulse. A reference edge transition in the data stream causes a rise in the output of exclusive-OR gate 80, triggering both monostable multivibrators 86 and 88. The period of each of the latter is set to be more than half, but less than a whole bit period for the bit data rate associated therewith. In practice, a period of approximately 75% of the data bit period has been found to be acceptable.

As noted previously, data selector 96 determines which monostable multivibrator, 86 or 88, will clock the flip-flops 82 and 84, which occurs at the end of the selected period. Flip-flop 82 stores the sense of the incoming data, thus providing for the repetition of the process at the next reference edge. Flip-flop 84 stores the output of exclusive-OR gate 80 at the end of the timing period, which represents the state of the original data. The output of the bi-phase data detector appears on the "Q" terminal of flip-flop 84 and is applied to the input terminal of the RS422A. data driver 12b. Driver unit 12 is enabled by the signal applied thereto which is present on the "Q" terminal of monostable multivibrator 64.

The signals appearing on the "$\overline{Q}$" terminals of the monostable multivibrators 86 and 88 provide a bit edge clock signal, and could in certain applications, be used to clock out the demodulated data. However, it has an approximate 75% for logical "1", 25% for "0", duty cycle which is not advantageous in the present system. Accordingly, the "$\overline{Q}$" terminals of monostable multivibrators 86 and 88 are connected respectively to the "B" input terminals of an additional pair of monostable multivibrators 98 and 100. The former has a period of 270 nanoseconds; the latter, 1.6 microseconds. The bit edge clock signals trigger the last mentioned multivibrators which generate a clock with an approximate 50% duty cycle. Based upon the signal in the "S" input terminal of the data selector 96, clock pulses from either monostable multivibrator 98 or 100 are directed via output terminal "$Y_B$" to the input of the RS422A clock driver 12a.

In an actual operative embodiment of the optical interface of the present invention, the following types of integrated circuits have been used. It should be understood that this information is provide solely for purpose of example and is not to be construed as limitative of the invention. The receiver unit 10 and driver unit 12 are types 26LS32 and 26LS31 respectively. All of the D-type flip-flops are type 74LS74A; monostable multivibrators 36, 62 and 64 are type 74LS123; the exclusive-OR gates are type 74LS86; the gates 42,44 and 94 are type 74LS00; the transmitting driver units are type 75451B; the data selector 96 is type 74LS157; the inverters are type 74LS04; monostable multivibrators 86, 88, 98 and 100 are type 4LS221; LED's 54 and 60 are HFBR-1204; and the fiber optic receiving units are HFBR-2202. It should be noted that LS-TTL logic has been used primarily to minimize power requirements and to optimize speed. Other logic families may be successfully employed if their delays are comparable.

In conclusion, there has been disclosed a fiber optic interface which finds particular application in the interconnection of a plurality of workstations. As such, the interface of the present invention is a direct replacement for the wired interface used heretofore and provides a variety of concomitant advantages. Depending upon the particular application, changes and modifications may be required in the interface taught herein. Such changes and modifications insofar as they are not departures from the true scope of the invention, are intended to be covered by the claims which follow.

What is claimed is:

1. A fiber optic interface for a cluster arrangement of workstations each capable of transmitting and receiving coded data in at least one of a plurality of bit rates comprising:

at least one fiber optic receiving unit disposed in one of said workstations for receiving said coded data at a given one of said bit rates, data detector means for demodulating said coded data, said detector means including a first exclusive-OR gate, first and second flip-flops, and a first plurality of monostable multivibrators having respective triggered output pulse durations which are predetermined first functions of said plurality of bit rates, said coded data being applied to said first exclusive-OR gate and to said first flip-flop, the output of said first flip-flop also being applied to said exclusive-OR gate, the output of said last mentioned gate being applied to said second flip-flop and in common to said first plurality of monostable multivibrators to trigger the latter, a second plurality of monostable multivibrators having respective triggered output pulse durations which are predetermined second functions of said plurality of bit rates, first edge detector means for receiving said coded data, the output of said edge detector means being applied in common to said second plurality of monostable multivibrators to trigger the latter upon each transition of said coded data, a third flip-flop coupled to a given one of said second plurality of monostable multivibrators, the state of said third flip-flop being a function of the relative pulse durations of said given one of said monostable multivibrators and that of the pulse interval of said coded data, data selector means interposed between the respective outputs of said first plurality of monostable multivibrators and said third flip-flop, the output level of the latter flip-flop serving to select one of said first plurality of monostable multivibrators and to steer the output pulse therefrom to both said first and second flip-flops to clock the latter, the outputs of said second flip-flop and the selected one of said first plurality of monostable multivibrators providing respectively demodulated data and bit edge clock pulses.

2. A fiber optic interface as defined in claim 1 wherein said edge detector means comprises a second exclusive-OR gate having a pair of input terminals and an output terminal, said coded data being applied to one of said last mentioned input terminals, a first and a second inverter gate connected in series relationship, each of said inverter gates having an input and an output terminal, the input terminal of said first inverter gate being coupled to the output terminal of said second exclusive-OR gate, the output terminal of said second inverter gate being coupled to the other of said pair of input terminals of said second exclusive-OR gate, and capacitive means connected in parallel across said second inverter gate.

3. A fiber optic interface as defined in claim 2 wherein said given one of said second plurality of monostable multivibrators provides a triggered output pulse duration which is less than the bit duration corresponding to a predetermined one of said plurality of bit rates, the "timing-out" of said last mentioned multivibrator causing said third flip-flop to switch from one stable state to its opposite state, the switching of said third flip-flop being indicative of the reception of said coded data at said predetermined one of said plurality of bit rates.

4. A fiber optic interface as defined in claim 3 further including encoder means for combining clock and data signals for transmission, said encoder means comprising fourth and fifth flip-flops, third and fourth exclusive-OR gates and a third inverter gate, each of said last mentioned exclusive-OR gates having a pair of input terminals and an output terminal, each of said fourth and fifth flip-flops having an input terminal, "Q" and "$\overline{Q}$" output terminals and a "CLK" terminal, said data signals being applied to an input terminal of said third exclusive-OR gate, the "Q" output terminal of said fourth flip-flop being coupled to the other input terminal of said third exclusive-OR gate, the output terminal of said last mentioned gate being coupled to the input terminal of said fourth flip-flop, said clock signals being applied to said "CLK" terminal of said fourth flip-flop and after inversion in said third inverter gate to the "CLK" terminal of said fifth flip-flop, the "$\overline{Q}$" terminal of the last mentioned flip-flop being coupled to the input terminal thereof, the "$\overline{Q}$" and "Q" terminals of said fourth and fifth flip-flops respectively being coupled to the input terminals of said fourth exclusive-OR gate, said coded data appearing on the output terminal of said last mentioned gate.

5. A fiber optic interface as defined in claim 4 further including a second edge detector means of identical circuit configuration to said first edge detector means, said clock signals being applied to said second edge detector means, a transmit monostable multivibrator, the output of said second edge detector means being applied to said transmit monostable multivibrator to trigger the latter, the output level duration of said transmit monostable multivibrator being chosen such that it is longer than the interval between successive clock signals, at least one output driver and associated LED emitter, said coded data appearing on the output terminal of said fourth exclusive-OR gate being applied to said output driver, the output level of said triggered transmit monostable multivibrator being applied concurrently with said coded data to said output driver to enable the latter, whereby said coded data is transmitted by said LED emitter.

6. A fiber optic interface as defined in claim 5 further characterized in that said output level of said triggered transmit monostable multivibrator is coupled to the respective reset terminals of said second plurality of monostable multivibrators to insure their inactive status during the transmission of said coded data, and the output level of a predetermined triggered one of said second plurality of monostable multivibrators being applied to the reset terminal of said transmit monostable multivibrator to insure its inactive status during the reception of said coded data.

7. A fiber optic interface as defined in claim 6 further characterized in that said coded data is bi-phase zero.

8. A fiber optic interface as defined in claim 7 wherein the triggered pulse durations of said first plurality of monostable multivibrators are respectively greater than half but less than the whole data bit durations corresponding to said plurality of bit rates.

9. A fiber optic interface as defined in claim 8 further including a third plurality of monostable multivibrators having respective triggered output pulse durations which are predetermined third functions of said plurality of bit rates, the output pulses of said first plurality of monostable multivibrators being coupled respectively to said third plurality of monostable multivibrators to trigger the latter, the respective output pulses of said last mentioned monostable multivibrators being applied to said data selector means, the state of said third flip-flop serving to select one of said third plurality of monostable multivibrators, the output of the selected monostable multivibrator providing a clock pulse of predetermined duty cycle for said fiber optic interface.

10. A fiber optic interface as defined in claim 9 wherein the triggered pulse durations of said third plurality of monostable multivibrators correspond respectively to substantially one-half of the bit intervals associated with said plurality of bit rates.

11. A fiber optic interface as defined in claim 10 wherein a pair of fiber optic receiving units are provided and are associated respectively with "upstream" and "downstream" transmitting workstations, and a fifth exclusive-OR gate coupled to receive the outputs of said pair of receiving units and to apply said coded data therefrom to said first exclusive-OR gate of said data detector means.

12. A fiber optic interface as defined in claim 11 wherein a pair of output drivers and associated LED's are provided for transmitting said encoded data respectively to receiving "upstream" and "downstream" workstations.

13. A fiber optic interface as defined in claim 12 further including gating means interposed between each of said fiber optic receiving units and one of said output drivers for passing said encoded data unchanged, except for inversion, to other workstations in said cluster.

14. A fiber optic interface as defined in claim 13 wherein said plurality of bit rates are 1.8432 M bits and 307.2K bits, the former having a bit period of 543 nanoseconds and the latter, 3.25 microseconds, said first, second and third pluralities of monostable multivibrators each comprising a pair of multivibrators.

* * * * *